United States Patent

Papadakis

[15] 3,664,902

[45] May 23, 1972

[54] NONUNIFORM PRESSURE BONDING METHOD

[72] Inventor: Emmanuel P. Papadakis, Acton, Mass.

[73] Assignee: Bell Telephone Laboratories, Incorporated, Murray Hill, N.J.

[22] Filed: Jan. 9, 1970

[21] Appl. No.: 1,711

[52] U.S. Cl. ............................................156/580, 100/93 P
[51] Int. Cl. ....................................B30b 15/34, B32b 31/20
[58] Field of Search..................156/583, 580, 285, 286, 295; 100/93 P

[56] References Cited

UNITED STATES PATENTS

| | | | |
|---|---|---|---|
| 3,056,440 | 10/1962 | De Mello | 100/93 RP X |
| 3,453,166 | 7/1969 | Herriott et al. | 156/295 |

*Primary Examiner*—Benjamin A. Borchelt
*Assistant Examiner*—J. J. Devitt
*Attorney*—R. J. Guenther and Arthur J. Torsiglieri

[57] ABSTRACT

A method is described which utilizes an elastic body of curved surface area to bond large area slabs to substrates. The bonding agent is applied to the interface between the slab and substrate and enough pressure is applied to the complaint body to flatten it out over the entire area of the slab. A pressure gradient will result along the interface which will force the bonding agent to flow toward the edges of the slab. An extremely thin, highly uniform bond is therefore achieved.

7 Claims, 2 Drawing Figures

INVENTOR
E. P. PAPADAKIS
BY
ATTORNEY

NONUNIFORM PRESSURE BONDING METHOD

BACKGROUND OF THE INVENTION

This invention relates to a bonding method which will achieve extremely thin, uniform bonds. While the method was developed for the fabrication of ultrasonic delay lines, it is clearly applicable to other structures. Furthermore, although use of epoxy resins as bonding agents is generally described, the method is applicable to other polymers, melted solids, softened glasses, visco-elastic materials and to solids fused by thermal compression.

In ultrasonic delay lines utilizing bulk solid delay media, the behavior of the ultrasonic beam depends on the size and shape of the radiating and receiving transducers bonded thereto. In order to shape and steer the ultrasonic beam properly, very large area transducers, e.g., 8 × ¼" are often needed. On the other hand, the transducer must have a thickness of the order of one-half wavelength at the operating frequency to achieve maximum efficiency. This necessitates that the bond between the transducer and delay line be extremely thin and uniform to avoid any adverse effects by the bonding agent on the ultrasonic beam.

To achieve a sufficiently thin, uniform bond, pressure must be applied to the free surface of the transducer in such a way as to force out the excess amount of adhesive from the transducer-delay line interface, and the resulting thin layer must be maintained during the hardening of the adhesive. The use of a constant pressure applied across the entire surface of the transducer during the bonding process tends to trap the adhesive, resulting in a sacrifice of the desired uniformity. To meet this problem, the method described in U.S. Pat. No. 3,453,166 was developed. The latter invention utilized an inflatable membrane to apply the bonding pressure. The pressure was initially applied along the center line of the slab by the membrane and the membrane was then inflated until the entire slab was under pressure and the excess epoxy was squeezed out. While the desired bond could be achieved, an operator or a timing device was needed to follow a prescribed cycle of temperature and pressure versus time for the inflation of the membrane. An excessive rate of inflation would trap epoxy under the slab by pushing down the edges of the slab before the outward flow of the adhesive was complete.

BRIEF SUMMARY OF THE INVENTION

Accordingly, it is a prime object of this invention to produce a very thin, highly uniform bond between a thin slab and a solid substrate without the need of a complicated pressure-time-temperature cycle.

This and other objects are achieved by a bonding process which utilizes an elastic cylinder or sphere as a pressure applicator. A bonding agent such as epoxy resin is deposited on the slab-substrate interface. Upon the application of a certain force to the sphere or a certain force per unit length to the cylinder, the surface touching the slab will flatten out until it covers the entire surface of the slab. A pressure profile will be immediately established so that the pressure on the slab-substrate interface is a maximum at the center (for the spherical case) or along the center line (for the cylindrical case) of the compliant body and a minimum at the edges of the slab. Outward flow of the epoxy will occur as long as it is fluid. The thickness of the bond is thus independent of the rate of application of the pressure on the compliant body and is fairly insensitive to the magnitude of the pressure above the minimum needed to flatten the compliant body over the entire surface of the slab. While the description is given in terms of a cylindrical or spherical applicator, it should be obvious that any solid with a curved surface will produce a pressure profile which may be used in this process.

BRIEF DESCRIPTION OF THE DRAWINGS

These and other objects and features of the invention will become clearer in the detailed description to follow and in the drawings, in which.

DETAILED DESCRIPTION OF THE INVENTION

Timoshenko and Goodier, Theory of Elasticity, 2d Ed., 1951, McGraw-Hill at pp. 372–382 give the solution to the force and displacement characteristics at the contact surface of two parallel cylinders pressed against each other. This solution is valid when St. Venant's principle holds, i.e., when the points of application of the forces pushing the cylinders together are far from the contact surface in comparison to the width of the contact surface. If two cylinders are of radii $R_1$ and $R_2$, Young's moduli $E_1$ and $E_2$ and Poisson's ratios $\gamma_1$ and $\gamma_2$, respectively, and a force per unit length P' presses the cylinders together, contact is made over an area of half width $b$. There will then result a "pressure profile" across the contact area in the form of an ellipse, with a maximum pressure along the center line $q_o$ and with the pressure falling to zero at $\pm b$. The expressions which define this system are given by:

$$b=[4P'R_1R_2(K_1+K_2)/(R_1+R_2)]^{1/2}, \qquad (1)$$

and $$q_o=[P'(R_1+R_2)/\pi^2(K_1+K_2)R_1R_2]^{1/2}, \qquad (2)$$

where $$K=(1-\nu^2)/\pi E. \qquad (3)$$

Figure 1:
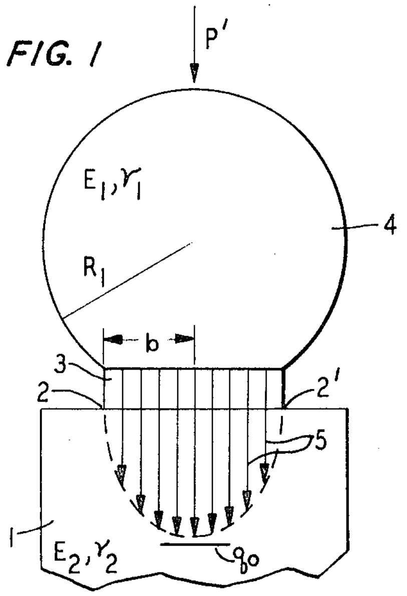
FIG. 1 is a schematic illustration of the bonding process showing the presence of the pressure profile.

FIG. 1 illustrates an embodiment of the invention. The substrate 1 is typically a delay line and it is composed of a material with Young's modulus $E_2$ and Poisson's ratio $\gamma_2$ as shown. An epoxy resin is applied to the interface, 2—2', between the substrate and the slab to be bonded, 3, which is typically a transducer. The transducer has a half-width $b$ as shown.

A cylinder, 4, of radius $R_1$, Young's modulus $E_1$ and Poisson's ratio $\gamma_1$ is placed atop the slab and a force per unit length of the cylinder P' is applied until the entire surface of the slab is covered as shown in the figure. The resulting "pressure profile" is represented by vectors 5, with the maximum pressure $q_o$ appearing along the center line of the slab. As shown in the drawing, the pressure profile produced is a semiellipse of the form:

$$\frac{X^2}{b^2}+\frac{Y^2}{q_o^2}=1. \qquad (4)$$

The excess epoxy will be squeezed out toward the edges of the slab by the resulting pressure gradient, $-dY/dX$, given by the expression:

$$\frac{-dY}{dX}=\frac{q_o}{b}\frac{X}{b}\frac{1}{\sqrt{1-X^2/b^2}} \qquad (5)$$

This outward gradient will exist as long as the cylinder does not overlap the edges of the slab to any great extent.

In order to compress the compliant body over a large area slab, it is necessary that the compliant body be extremely elastic in comparison to the substrate, i.e., $E_1/E_2 << 1$. More specifically, this fraction should range from $10^{-3}$ to $10^{-5}$. With this factor in mind, equations (1) and (2) can be rewritten for the special case here where $R_2 \to \infty$:

$$b \cong [4P'R_1(1+\nu_1^2)/E_1]^{1/2}, \qquad (6)$$

$$q_o \cong [P'E_1/\pi^2(1+\nu_1^2)R_1]^{1/2}. \qquad (7)$$

These then are the parameters for the use of a compliant cylinder pressed against a stiff plane. Thus, to bond a slab of a given half-width $b$ by using a cylinder of a particular material, the required force density $P'$ and the resulting maximum pressure $q_o$ may be calculated for various values of $R_1$ and $E_1$. Some representative values for a rubber cylinder are given in Table I.

TABLE I

Values of $P'$ and $q_o$ for Rubber Cylinders $\nu_1 = 0.5$ and b= 0.125 in.

| $E_1$, p.s.i. | $R_1$, in. | $P'$, lb./in. | $q_o$, p.s.i. |
|---|---|---|---|
| 500 | 0.25 | 20 | 57 |
| | 0.50 | 10 | 28 |
| | 1.00 | 5 | 14 |
| 1000 | 0.25 | 39 | 113 |
| | 0.50 | 20 | 57 |
| | 1.00 | 10 | 28 |
| 2000 | 0.25 | 78 | 225 |
| | 0.50 | 39 | 113 |
| | 1.00 | 20 | 57 |

According to this method several bonds of epoxy resin have been made on polished and plated fused quartz substrates ½ inch wide and 5 to 15 inches long. Transducers 15 mil thick by ¼ inch wide and up to 8 inches long were bonded to these substrates by using neoprene cylinders with $2b < R_1 < 8b$. During bonding, the substrates were held at 60° C. for one hour after the initial pressure application, and were then allowed to cool and cure with the pressure still on. In general, bonds resulted which were uniformly under 150 angstroms thick and which held up under the usual grinding and plating operations necessary to produce high frequency transducers.

Timoshenko and Goodier also give the solution for the force and displacement characteristics at the contact surface of two spheres. If the area of contact is considered in the $X$-$Y$ plane and the force is exerted in the $Z$- direction at the center of the sphere, the pressure profile produced is spheroidal according to the relation:

$$\frac{X^2}{B^2}+\frac{Y^2}{B^2}+\frac{Z^2}{Q_o^2}=1, \qquad (8)$$

where B is now the radius of the contact area and $Q_o$ is the maximum pressure at the center of the contact area. In this case the contact area is a circle in the X-Y plane and there is a pressure gradient along the radius of the circle $r=(X^2+Y^2)^{1/2}$ which will cause outward flow of the bonding agent. If FIG. 1 is considered a cross-sectional view at the center of the sphere in the $X$-$Z$ plane, it accurately represents the profile for this case. Once again, realizing that for purposes of this invention $R_2 \rightarrow \infty$ and $E_1/E_2 << 1$, the parameters of the system are:

$$B=[3PR(1-\nu_1^2)/4E_1]^{1/3} \qquad (9)$$

$$Q_o=3P/2\pi B^2. \qquad (10)$$

In these equations P is now the total force upon the sphere.

Using this configuration it is also possible to achieve uniform bonds with a thickness of under 150 Angstroms.

It should be clear that there are some limits on the value of $R$ for the method to work. The radius must be at least large enough so as to allow the depression of the body over the entire slab. If the radius is too great or the compliance too large, the body will flatten out to the edges of the slab at a pressure insufficient to cause adequate flow. It is believed that for compliant bodies of the type useful for this process, a preferred range is $b < R < 30b$.

Figure 2:
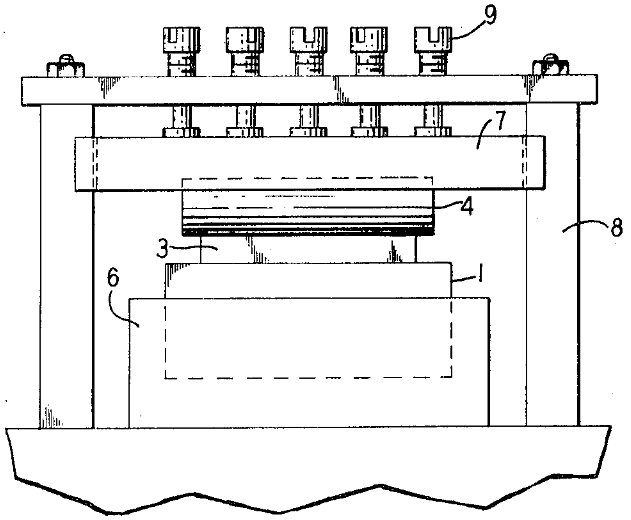
FIG. 2 is a frontal view of an apparatus for practicing the process.

One embodiment of an apparatus for carrying out the above described process is shown in simplified form in FIG. 2. The substrate, 1, is placed within jig 6. The cylinder, 4, is mounted in a V-grooved bar, 7, which is slotted to slide vertically on the pillars, 8, of the bonding fixture. The force needed to depress the cylinder until it covers the width of slab 3 is supplied by a row of spring loaded screws, 9, tightened by torque wrenches. The force could be applied equally well by a row of hydraulic or pneumatic cylinders or other convenient devices. Calibration of the torque necessary to flatten out a cylinder over the entire area of the slab is possible with this apparatus. A test bar, polished flat and half-silvered, is used as the substrate and a polished, fully plated transducer laid thereon. As pressure is applied to the cylinder, interference fringes analogous to Newton's rings can be observed along the boundaries of the contact area until this boundary reaches the edges of the slab. The torque wrenches are then set to slip at the value of torque needed to turn the screws to achieve the needed deflection of the cylinder.

In the case of spheres, a similar apparatus can be used. In this case the V-grooved bar is replaced by a conically incised aluminum block which is also arranged to slide vertically on the pillars of the bonding fixture. Operation and calibration of the device is the same as described above. Similar apparatus can also be adopted for other pressure applicators.

It is understood that the embodiment described is merely illustrative of the inventive concept disclosed and herein claimed. Many variations may be practiced by persons skilled in the art without departing from the spirit and scope of the invention.

I claim:

1. A method for adhesively bonding a member to a substrate comprising the steps of:

applying an adhesive bonding agent to the interface between a member to be bonded and substrate, said substrate having a Young's modulus $E_2$, placing in contact with said member a pressure applicator in the form of a compliant solid having a curved surface, said compliant body having a Young's modulus $E_1$ such that $E_1/E_2 << 1$, while said member and substrate are held stationary applying a pressure to the compliant body sufficient to immediately flatten the body over the entire surface area of the member to be bonded and create a pressure gradient along the surface of the member sufficient to force the excess adhesive out of the interface.

2. An apparatus for adhesively bonding a member to a substrate comprising:

a jig for rigidly mounting the substrate, said substrate having a Young's modulus $E_2$, a pressure applicator comprising a compliant solid of curved surface area, said compliant body having a Young's modulus $E_1$ such that $E_1/E_2 << 1$, means for nonrotatably mounting said compliant solid upon the member to be bonded, means for applying sufficient pressure to said compliant body to immediately flatten said body over the entire area of the member to be bonded.

3. Apparatus in accordance with claim 2 wherein the means for applying said pressure consists of spring loaded screws turned by torque wrenches set to slip at the value of torque needed to achieve the desired deflection of the compliant body.

4. Apparatus in accordance with claim 2 wherein the compliant body is a cylinder.

5. Apparatus in accordance with claim 2 wherein the compliant body is a sphere.

6. The method according to claim 1 wherein the substrate is a delay line and the member to be bonded is a transducer.

7. The apparatus according to claim 2 wherein the substrate is a delay line and the member to be bonded is a transducer.

* * * * *